United States Patent [19]
Kohira

[11] Patent Number: 5,303,658
[45] Date of Patent: Apr. 19, 1994

[54] CONSTRUCTION OF STRUCTURAL BODY

[75] Inventor: Hiroaki Kohira, Hyogo, Japan

[73] Assignee: Kawasaki Jukogyo Kabushiki Kaisha, Hyogo, Japan

[21] Appl. No.: 31,857

[22] Filed: Mar. 16, 1993

[30] Foreign Application Priority Data

Mar. 18, 1992 [JP] Japan .................. 4-61998

[51] Int. Cl.$^5$ ............................ B61D 17/00
[52] U.S. Cl. .................. 105/401; 105/400; 105/423
[58] Field of Search ........... 105/396, 397, 400, 401, 105/409, 423, 399; 52/630, 674, 670, 450, 453, 334, 452, 454; 296/203, 191, 146 C

[56] References Cited

U.S. PATENT DOCUMENTS

| 2,164,646 | 7/1939 | Edahl . | |
|---|---|---|---|
| 2,291,621 | 8/1942 | Gunn | 105/401 |
| 2,657,645 | 11/1953 | Ecoff | 105/401 |
| 3,585,942 | 6/1971 | Shaver . | |
| 5,000,997 | 3/1991 | Ritchie et al. | 296/191 |

FOREIGN PATENT DOCUMENTS

| 1233595 | 10/1960 | France . | |
|---|---|---|---|
| 0075272 | 6/1981 | Japan | 296/191 |
| 61-220962 | 10/1986 | Japan . | |
| 61-220963 | 10/1986 | Japan . | |
| 0045258 | 2/1990 | Japan | 105/401 |
| 1032117 | 6/1966 | United Kingdom | 52/674 |

Primary Examiner—Mark T. Le
Attorney, Agent, or Firm—Oliff & Berridge

[57] ABSTRACT

A body structure for railroad cars and enclosed-type overhead bridges, which have a small number of components that are easy to manufacture and assemble, and which can secure a necessary strength with a reduced weight, is divided into an appropriate number of sections, i.e., a wainscot framework, a door pocket framework, a window framework, and a door lintel framework. These sections or frameworks are formed of a corrugated plate material. Post members are erected in each section in a direction perpendicular to the ribs. Each post member is formed with recesses to avoid interference with the ribs. The sections thus formed are joined together and outside plates are attached to the surface of the assembled sections to complete a body structure. The body structure thus formed has uniform strength over the entire area and therefore can prevent local out-of-plane deformations.

13 Claims, 7 Drawing Sheets

CONSTRUCTION OF STRUCTURAL BODY

BACKGROUND OF THE INVENTION

1. Field of the Invention

This invention relates to a construction of a body structure used in railroad cars or enclosed-type overhead bridges and more particularly to a construction of a body structure that is formed by using frameworks made by press working.

2. Description of the Prior Art

Enclosed body structures include railroad cars shown in FIGS. 6a-6b and 7a-7c as well as overhead bridges and boarding bridges. This specification takes a side structure that makes up the railroad car as an example in the following description.

As shown in these drawings, conventional body structures comprise: a rocker base 1 laid horizontally, which is used as a reference; various kinds of posts such as side door posts 2, slide door end posts 3 and wainscot panel side posts 4, all erected vertically on the rocker base 1; members such as a belt rail 5, a door pocket belt rail 6, a window header 7 and a door lintel 8, all mounted horizontally to these posts; and a slide door pocket post 9 and a frieze board side post 10, erected vertically with the horizontal members taken as references. These constitutional members are all welded together to form a framework of the body structure. Most of the planes of the framework of the body structure thus formed are lined with a wainscot panel 13, a door pocket plate 14 and a frieze board 15, all welded with reinforcement members 11, 12, to form a body structure having a window 16 and a side entrance 17.

Other conventional examples include a railway car body structure disclosed in Japanese Patent Preliminary Publication No. Showa 61-220962. This structure is comprised of a flat side outside plate and a corrugated compensation plate bound together. The compensation plate is formed with lateral projecting beads, which are triangular in cross section, and with vertical projected strips, which are U-shaped in cross section. Or rectangular corrugations are formed in the compensation plate, and core members are filled between the compensation plate and the side outside plate.

Another conventional example is the Japanese Patent Preliminary Publication No. Showa 61-220963. In this structure, a bead is formed in the direction of shearing force in a drift portion enclosed by the side post and the crosspiece.

These conventional body structures, however, have many drawbacks. The side structure is made of many kinds of and therefore a large number of members, which in turn increases the number of processes in working the members. In addition, the machining itself is complex. At the assembly phase, positioning of components is complex and requires many jigs. Since there are many welding portions, there are greater chances of strain, degrading the dimensional precision.

Furthermore, since the body structures of the Japanese Patent Preliminary Publication No. Showa 61-220962 and 61-220963 employ beads in forming corrugations, the corrugations formed are relatively small and thus their reinforcement effects are necessarily small.

SUMMARY OF THE INVENTION

This invention has been accomplished with a view to overcoming the above drawbacks and its objective is to provide a body structure which has a small number of components that are easy to work and assemble, and which is light but has a necessary strength.

To achieve the above objective, the construction of a body structure according to the present invention comprises: a specified number of sections, each having a specified size and formed integrally of a corrugated plate material, said corrugated plate material having a plurality of ribs and a plurality of holes to reduce the weight of the corrugated plate material; a plurality of reinforcement members provided to each section in a direction transverse to the corrugations or ribs, said reinforcement members having recesses to avoid interference with the ribs; and an outside plate member lined over the surface of said sections joined together.

The construction of a body structure according to this invention may comprise: a specified number of sections, each having a specified size; a part of said sections being formed integrally of a corrugated plate material, said corrugated plate material having a plurality of ribs and a plurality of holes to reduce the weight of the corrugated plate material; the remaining sections being formed of a plate material having holes cut therein to reduce the weight thereof and ribs formed around the holes; a plurality of reinforcement members provided to each section in a direction transverse to the corrugations or ribs, said reinforcement members having recesses to avoid interference with the ribs; and an outside plate member lined over the surface of said sections joined together.

BRIEF DESCRIPTION OF THE DRAWINGS

FIG. 7c is a cross section taken along the line 7c—7c of FIG. 6a.

DETAILED DESCRIPTION OF PREFERRED EMBODIMENTS

Now, embodiments of this invention will be described by referring to the accompanying drawings.

Figure 1:
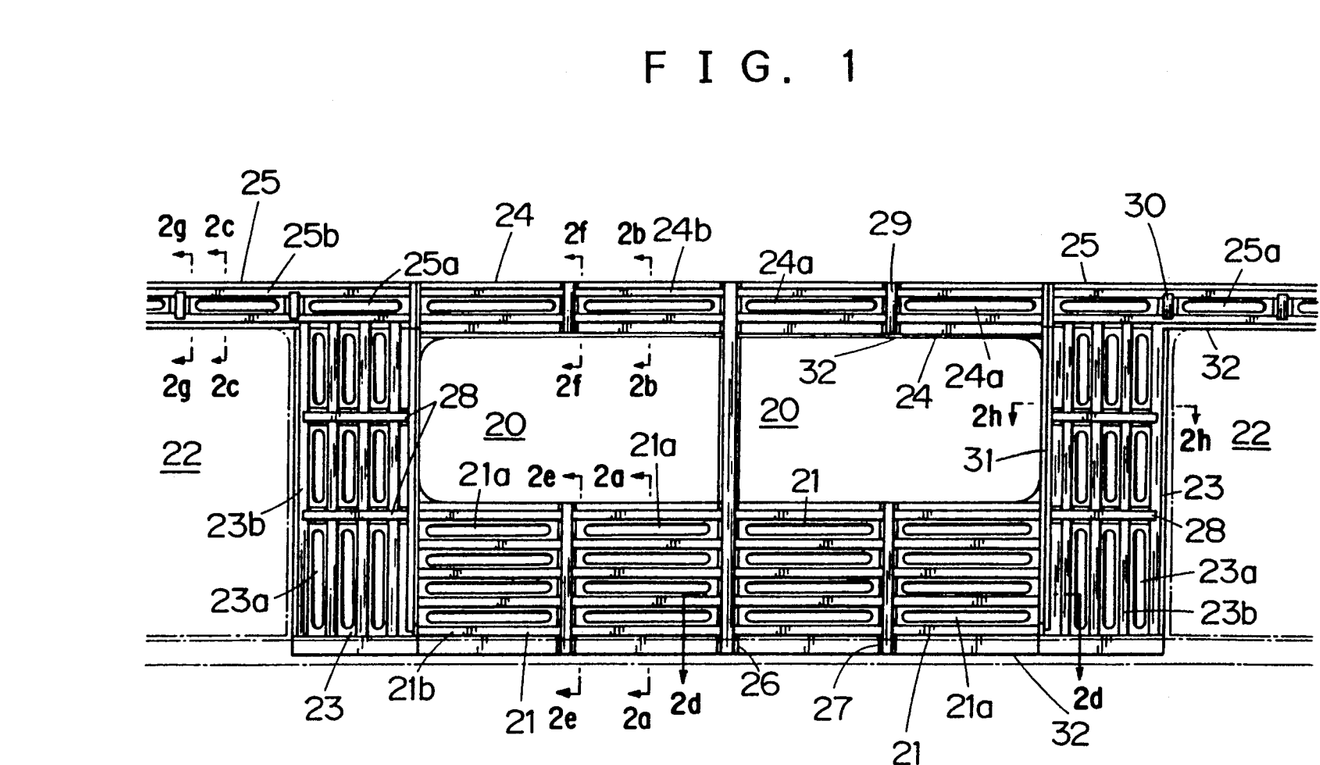
FIG. 1 is a front view of the body structure of the present invention.

FIG. 1 shows the side structure of a railway car as one embodiment of the present invention. In this invention, the side structure is divided into an appropriate number of sections. These sections are a wainscot framework 21 arranged below the window aperture 20 and divided in two at the center; a door pocket framework 23 arranged on each side of the window and having an entrance 22 formed on the opposite side of the window; a window head framework 24 arranged above the window; and a door lintel framework 25 arranged above the entrance 22.

Figure 2A:
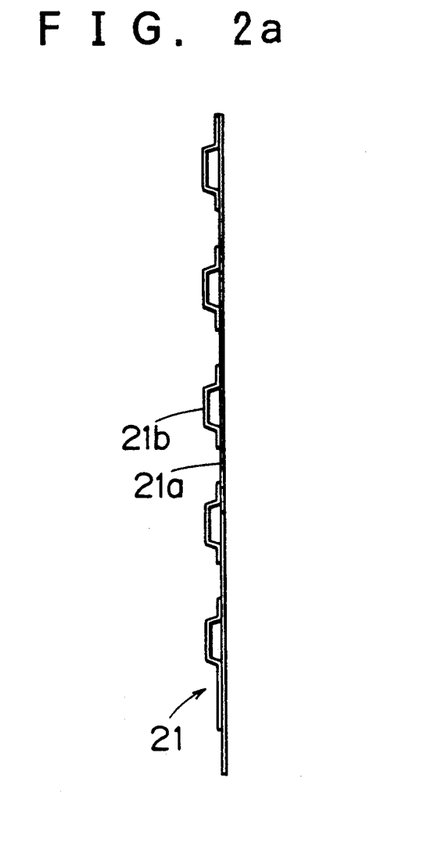
FIG. 2a is a cross section taken along the line 2a-2a of FIG. 1.

The wainscot framework 21 is a section that is formed by combining the rocker base 1, wainscot panel side posts 4, belt rail 5 and reinforcement member 11, all these used in the conventional example, into one integral structure. As shown in FIG. 2a, it consists of a corrugated plate of steel or stainless steel with holes 21a formed to reduce weight and with ribs 21b.

The door pocket framework 23 is a section that is formed by combining side door posts 2, slide door end post 3, slide door pocket post 9, reinforcement members 11, 12 and door pocket belt rail 6, all these used in the conventional example, into one integral structure and is further combined integrally with a corrugated plate made of the same metal as the wainscot framework 21. The door pocket framework 23 is formed with holes 23a and ribs 23b.

The window head framework 24 is a section that is formed by combining the window header 7 and frieze board side post 10, all these used in the conventional example, into one integral structure. Shown in cross section in FIG. 2b, it has holes 24a and ribs 24b as with the wainscot framework 21.

The door lintel framework 25 is a section that is formed in the similar manner to the window head framework 24, and has holes 25a and ribs 25b. FIG. 2c shows a cross section of the door lintel framework 25.

Figure 2B:
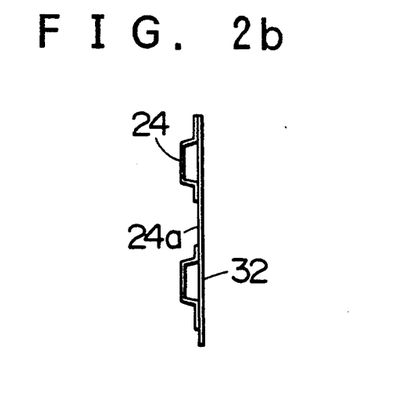
FIG. 2b is a cross section taken along the line 2b—2b of FIG. 1.
Figure 2C:
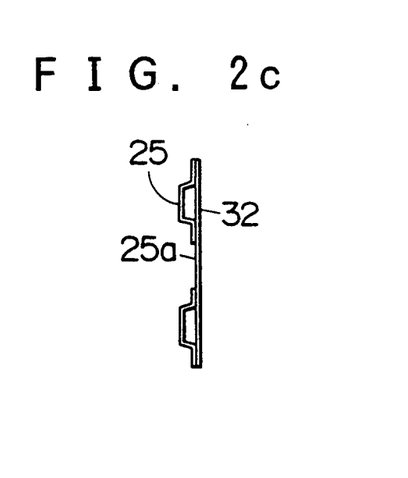
FIG. 2c is a cross section taken along the line 2c—2c of FIG. 1.

As can be seen from FIGS. 2a to 2c, the corrugated plates that form the above-mentioned sections are made of the same kind of material. The size of the ribs formed in each of the corrugated plates is determined such that they can provide a strength large enough to replace the slide door pocket post 9, wainscot panel side post 4, frieze board side post 10, reinforcement member 12, belt rail 5, and reinforcement member 11. The corrugated plate is cut into sections, and the positions of the holes to be made are determined, after which the corrugated sections are cut with holes by press working to produce the desired sections. The sections may be corrugated after being formed with holes.

Figure 2D:
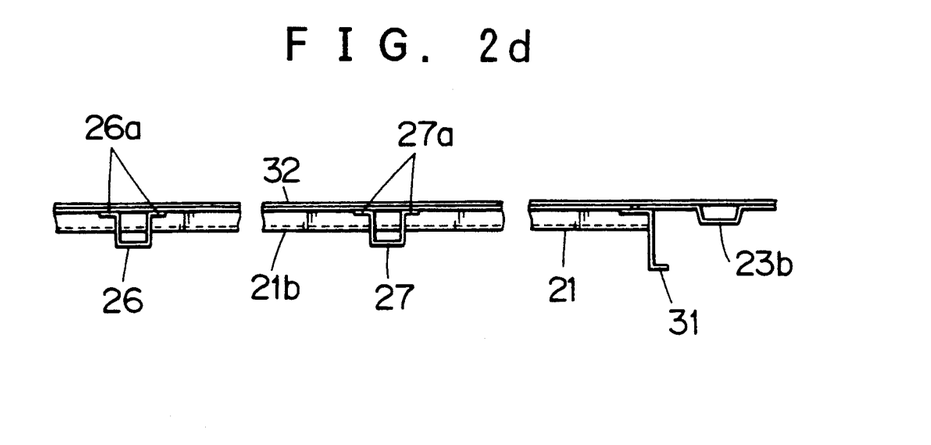
FIG. 2d is a cross section taken along the line 2d—2d of FIG. 1.
Figure 2E:
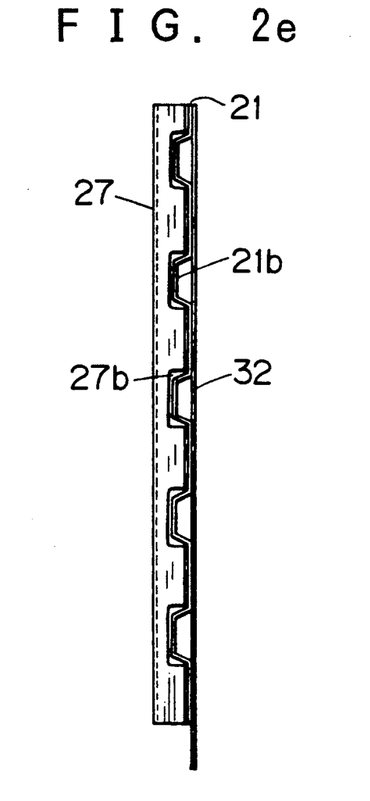
FIG. 2e is a cross section taken along the line 2e—2e of FIG. 1.

The sections 21, 23, 24, 25 thus formed separately have a small strength in a direction transverse to the corrugations and easily deform out of plane. To prevent this, reinforcement members, such as side post 26, wainscot post 27, door pocket reinforcement 28, frieze board 29 and substantially T-shaped door lintel reinforcement 30, are provided for improvement of strength. As shown in FIG. 2d, the side post 26 and the wainscot post 27 are channels U-shaped in cross section. Mounting edges 26a or 27a are formed extending from both ends of the U-shaped channel toward outside and are secured to the wainscot framework 21. The wainscot post 27, as shown in FIG. 2e, is formed with a plurality of recesses 27b at positions corresponding to the ribs 21b that cross the wainscot post 27 on the wainscot framework 21. Because of the recesses 27b, the wainscot post 27 can be connected to the wainscot framework 21, as by welding, without being interfered with by the ribs 21b. The side post 26 has the similar construction as the wainscot post 27 but spans from the upper end to the lower end of the body structure to reinforce both the wainscot framework 21 and the window head framework 24. The side post 26 also serves as a window frame that divides the window 20 into left and right halves. At the window portion there is no need to form recesses 27b in the side post 26.

Figure 2F:
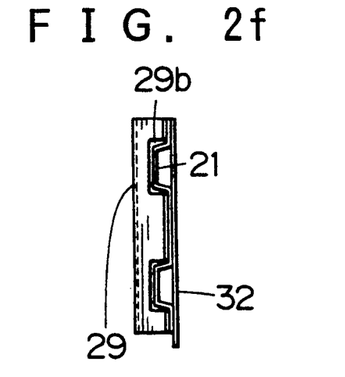
FIG. 2f is a cross section taken along the line 2f—2f of FIG. 1.
Figure 2G:
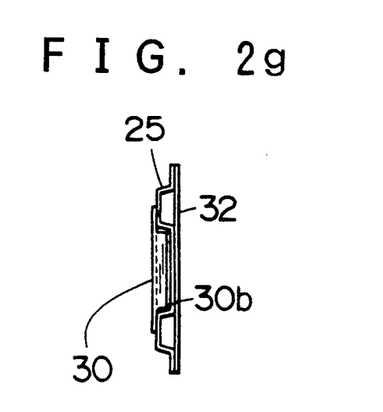
FIG. 2g is a cross section taken along the line 2g—2g of FIG. 1.

FIGS. 2f and 2g show the frieze board 29 and the door lintel reinforcement 30, respectively. These are basically the same in construction as the wainscot post 27. As clearly shown in FIG. 2g, door lintel reinforcement 30 contacts the ribs of door lintel framework 25. The door pocket reinforcement 28 also has basically the same construction as the wainscot post 27 though it is horizontally oriented.

Figure 2H:
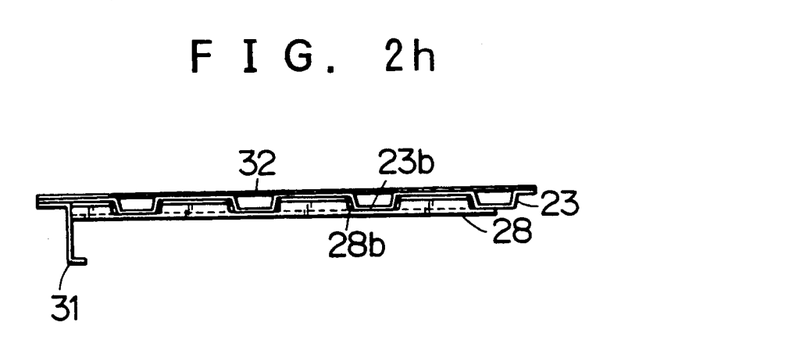
FIG. 2h is a cross section taken along the line 2h—2h of FIG. 1.

FIG. 2h shows the door pocket reinforcement 28 secured to the door pocket framework 23. The ribs 23b of the door pocket framework 23 fit into recesses 28b formed in the door pocket reinforcement 28. The left end of the door pocket reinforcement 28 is engaged with and positioned by the door end post 31. The door end post 31, as with the side post 26, extends from the upper end to the lower end of the body structure. Where it overlaps the door lintel framework 25, the door end post 31 is formed with recesses as with other members. But for the most part the door end post 31, unlike the side post, is arranged and fixed parallel to the ribs 23b of the door pocket framework 23. The door end post 31, as shown in FIG. 2h, has a Z-shaped cross section and clearly defines the boundary of the door pocket framework 23 and also serves as a window frame and a stopper for the door not shown.

The sections 21, 23, 24, 25 have their boundaries connected as by welding, and then are lined with outside plates 32 as shown in FIGS. 1 and 2a-h to be formed into a side structure as a single body structure. The outside plate 32 may be formed of a single metal plate or of divided plates combined together.

In this way, left and right side structures as well as the skirt, floor and roof are formed and they are assembled to form a car structure.

In the above construction, all the sections 21, 23, 24, 25 of the structure can be formed of the same kind of corrugated plate, providing a high level of versatility or flexibility in dealing with size differences arising from different shapes of the sections. Since, even when the longitudinal dimensions of the sections vary according to the types of the cars, the widthwise dimensions do not change, the reinforcement members 26–31 can use the same standard, improving the flexibility in manufacture. Since the sections are provided with ribs and members in the vertical and horizontal directions, they are not easily deformed out of plane.

Figure 3:
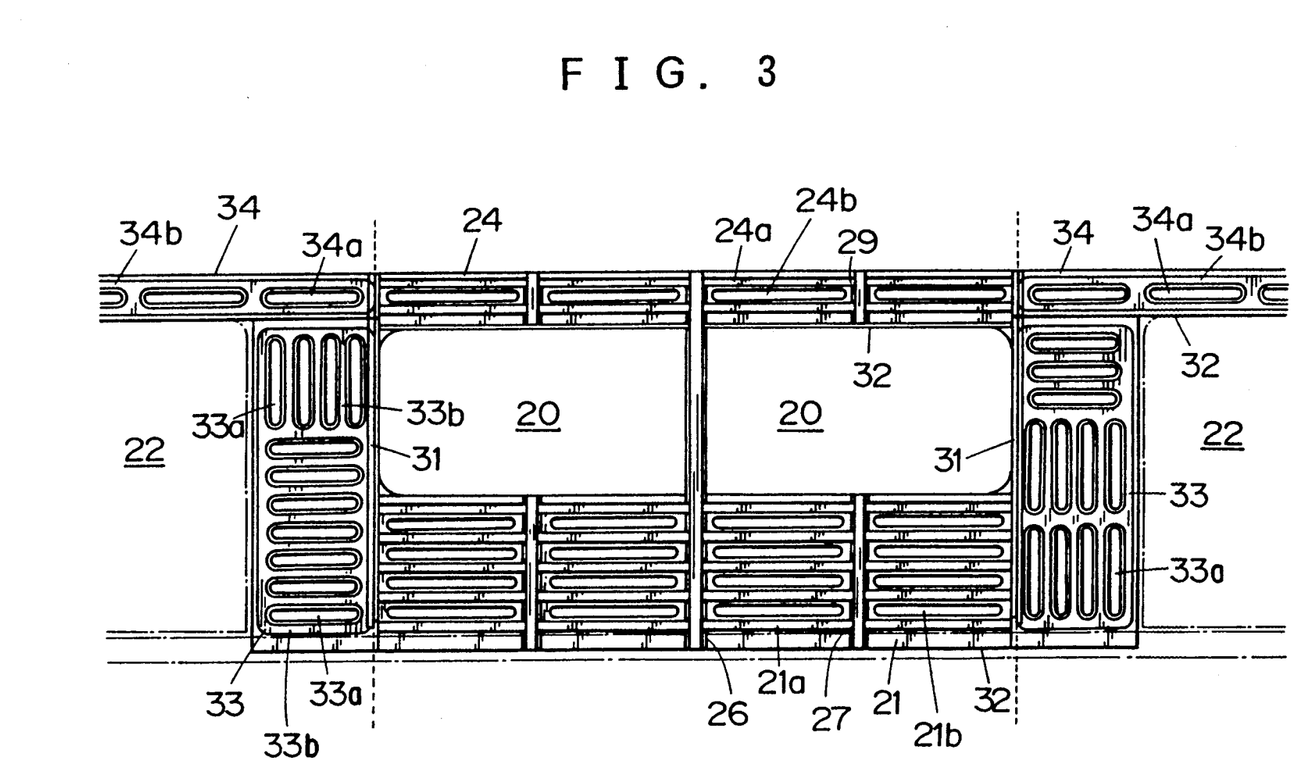
FIG. 3 is a front view showing another embodiment of the body structure according the present invention.

FIG. 3 shows another embodiment of this invention. This embodiment has many components identical with those shown in FIGS. 1 and 2a-h, so that only the difference will be explained. The door pocket framework 33 and the door lintel framework 34 are not formed of a corrugated plate as are other sections. As is seen from FIG. 3, they are made of a single flat metal plate which is cut with a plurality of vertical and horizontal elongate holes 33a, 34a and, around them, is formed with ribs 33b, 34b as by press working. Although the door lintel framework 34 has only horizontal ribs, the door end post 31, which is arranged in the same manner as in the first embodiment of FIG. 1, works as a vertical rib.

After the sections are combined, the outside plate 32 is lined over the surface of the structure, as in the case of the first embodiment of FIG. 1.

In this construction, the door pocket framework 33 and the door lintel framework 34 cannot be formed of only the same kind of corrugated plate as other sections. When a railway car's body structure is to be made, what is required to be changed according to the type of the car is often the length of the wainscot framework 21 and the window head framework 24. The shape of the door lintel framework 34 located above the entrance of the door pocket framework 33 is often of the same kind regardless of the type of the car. Therefore, a material with versatility, i.e. a corrugated plate, is used for that part of the structure which may be required to change according to the type of the car. For the door pocket framework and door lintel framework, both of whose dimensions do not change according to the type of the car, a special material may be used without practically losing the versatility.

Figure 4:
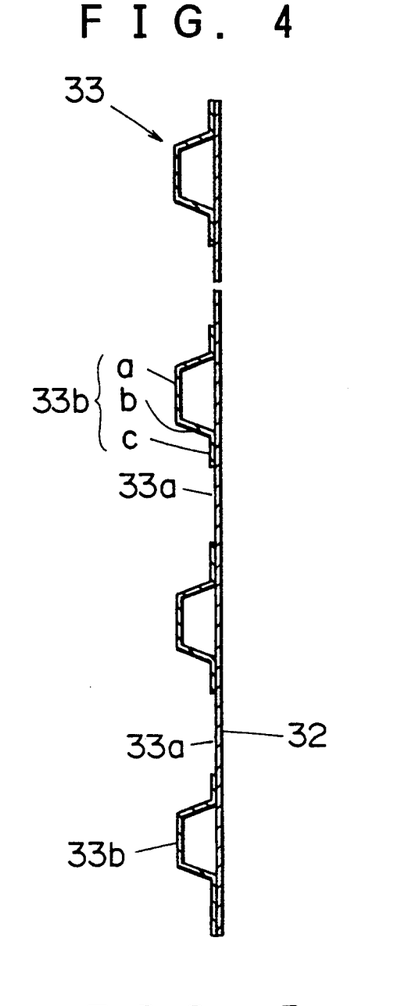
FIG. 4 is a cross section showing an example embodiment of a rib whose cross section is a trapezoid.

FIG. 4 shows an embodiment of ribs whose cross section is trapezoidal. Rib 33b consists of a reinforcement portion a located at the top parallel to the outside plate 32, webs b bent from each end of the reinforcement portion a toward the outside plate 32, and flanges c formed extending from the ends of the webs b to around the holes 33a cut in a staggered arrangement.

Figure 5:
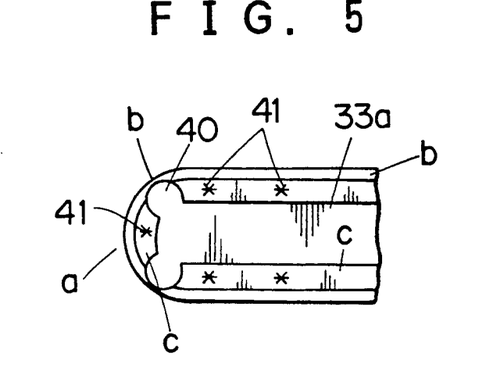
FIG. 5 is a front view showing a portion surrounding notches formed in the flange.
Figure 6A:
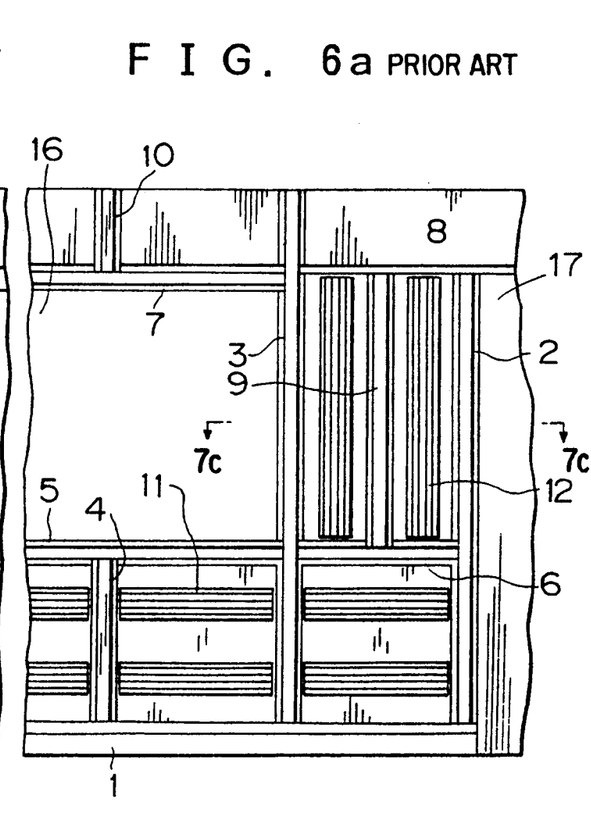
FIG. 6a is a side view showing a side structure as a conventional body structure, as seen from inside the room.
Figure 6B:
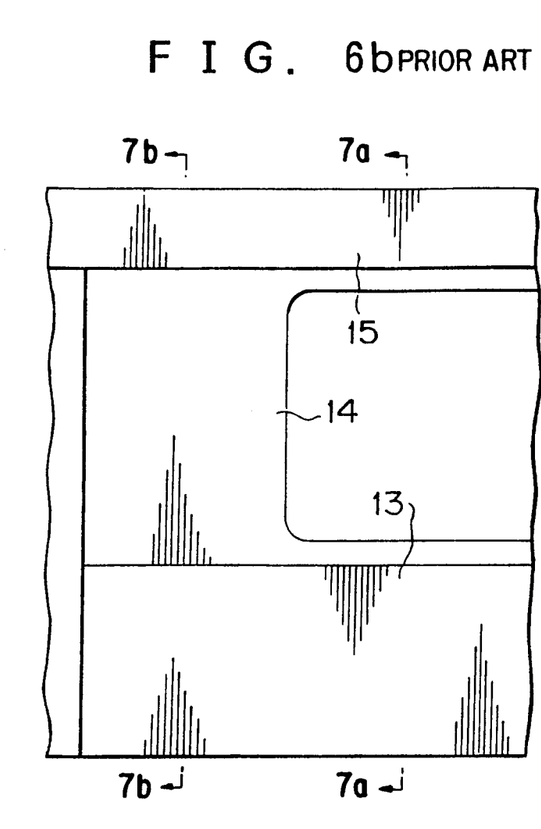
FIG. 6b is a side view as seen from outside the room.
Figure 7A:
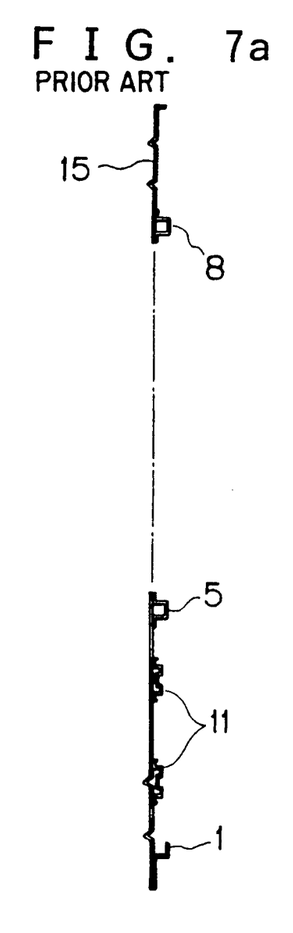
FIG. 7a is a cross section taken along the line 7a—7a of FIG. 6b.
Figure 7B:
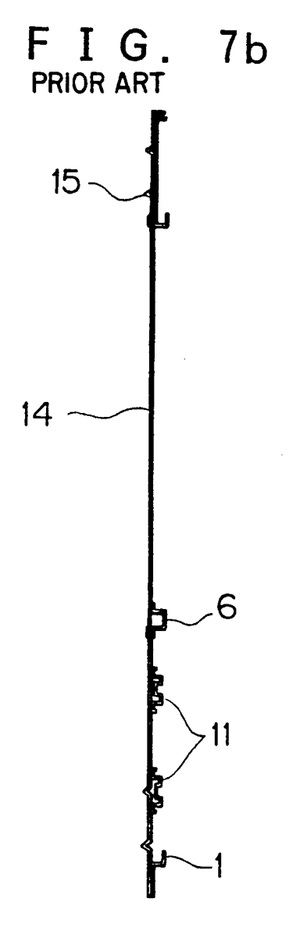
FIG. 7b is a cross section taken along the line 7b—7b of FIG. 6b.
Figure 7C:
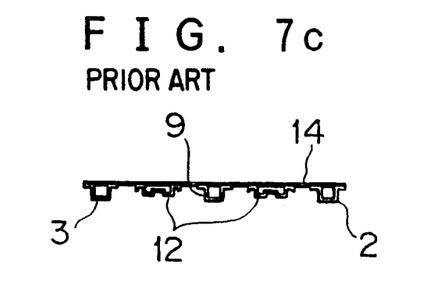

FIG. 5 shows the details of the holes 33a and the ribs 33b formed in the door pocket framework 33. Their construction is commonly used in other sections of the side body structure of the railway car. The ribs 33b, 34b shown in FIG. 3 are formed by drawing process by the pressing machine. However, forming the flange c of uniform width around the holes 33a (or 34a) is often difficult depending on the malleability of the material because cracks and wrinkles easily develop there. To avoid this problem, notches 40 are formed at appropriate locations in the flange c. This permits the flange to be drawn easily. In the example shown, the notches 40 are formed at the arc portion of the flange because this portion is most likely to develop cracks and wrinkles. If necessary the notches may be formed at the linear part of the flange. Reference numeral 41 represents spot-welded portions between the flange and the outside plate.

The cross-sectional shape of the ribs shown in FIGS. 1 and 3 is not limited to rectangle or trapezoid shown above but may take other forms such as sine curves as long as the desired strength can be secured.

As mentioned above, according to the first aspect of this invention, all the sections of the side body structure can not only be formed of the same kind of corrugated plate material but also cope flexibly with the differing sizes according to different types of body structures. This flexibility permits the body structure of this invention to be applied not only to mass production but also to small-scale production. Further, since uniform strength can be obtained over the entire structure, local deformation out of plane in the body structure can be prevented.

According to the second aspect of this invention, since a part of each section of the body structure is formed with holes cut in the plate material to reduce the weight and with ribs drawn by press working around the holes, a freedom of the design increases in terms of strength and dimensions.

What is claimed is:

1. A construction of a body structure comprising:
a specified number of sections, each having a specified size and formed integrally of a corrugated plate material, said corrugated plate material having a plurality of ribs and a plurality of holes to reduce the weight of the corrugated plate material;
a plurality of reinforcement members provided to each of said sections, and oriented in a direction transverse to said ribs, said reinforcement members having recesses positioned over said ribs to prevent interference with said ribs; and
an outside plate member lined over the surface of said sections joined together.

2. A construction of a body structure comprising:
a specified number of sections, each having a specified size;
said sections including a plurality of first section members, each of said first section members being formed integrally of a corrugated plate material, said corrugated plate material having a plurality of ribs and a plurality of holes to reduce the weight of the corrugated plate material;
said sections further including a plurality of second section members, each of said second section members being formed of a plate material having holes cut therein to reduce the weight thereof and ribs formed around the holes;
a plurality of reinforcement members provided on each of said first section members and oriented in a direction transverse to the ribs of said each of said first section members, said reinforcement members having recesses positioned over said ribs of said first section members to prevent interference with the ribs of said first section members; and
an outside plate member lined over surfaces of said sections joined together.

3. A body structure, comprising:
a plurality of sections, each formed integrally of a corrugated plate material, said corrugated plate material having a plurality of ribs and a plurality of holes disposed between the ribs;
a plurality of reinforcement members provided on said body structure, said reinforcement members being oriented in a direction transverse to said ribs and having recesses positioned over said ribs to prevent interference with the ribs; and
an outside plate member disposed over surfaces of said sections, at least two of said sections being joined together.

4. The body structure of claim 3, wherein said sections are first sections, and wherein the body structure further comprises a plurality of second sections, each second section being formed of a non-corrugated plate material having holes therein, ribs being formed between the holes;
wherein at least one of said first sections and at least one of said second sections are joined together, and said outside plate member is disposed over surfaces of said first and second sections.

5. The body structure of claim 4, wherein the non-corrugated plate material is substantially flat.

6. The body structure of claim 4, further comprising a window aperture and a door aperture through the body structure, the window aperture being defined by at least one of said first sections and the door aperture being defined by at least one of said second sections.

7. The body structure of claim 6, wherein the window aperture includes first, second, third and fourth sides, the first and third sides being disposed opposite each other and the second and fourth sides being disposed opposite each other, at least two of the first sections bordering the window aperture on its first and third sides, respectively, and at least two of the second sections bordering the window aperture on its second and fourth sides, respectively.

8. The body structure of claim 7, wherein the door aperture includes at least three sides, at least one of the second sections bordering the door aperture on each of the at least three sides.

9. The body structure of claim 8, wherein at least one of the second sections borders both the door aperture and the window aperture.

10. The body structure of claim 4, further comprising a window aperture extending through the body structure, wherein at least one of the reinforcement members extends across the window aperture.

11. The body structure of claim 10, wherein one of the ribs is disposed on one side of the window aperture and another one of the ribs is disposed on an opposite side of the window aperture, further wherein the recesses of the at least one reinforcement member extending across the window aperture are positioned over said ribs disposed on the one side and the opposite side of the window aperture.

12. The body structure of claim 3, wherein said reinforcement members are first reinforcement members and the body structure further comprises at least one substantially T-shaped second reinforcement member extending between two of the ribs.

13. The body structure of claim 12, wherein the second reinforcement member contacts said two ribs and extends into a space formed between said two ribs.

* * * * *